July 26, 1932.　　　R. GARGIULO　　　1,869,139

HYDRO CYCLE

Filed Feb. 11, 1932

INVENTOR
Richard Gargiulo
BY
ATTORNEY

Patented July 26, 1932

1,869,139

UNITED STATES PATENT OFFICE

RICHARD GARGIULO, OF NEW YORK, N. Y.

HYDRO-CYCLE

Application filed February 11, 1932. Serial No. 592,278.

This invention relates to new and useful improvements in a hydrocycle.

The invention has for an object the construction of a hydrocycle which is characterized by the provision of a plurality of floats substantially in the form of wheels and detachably arranged for being mountable upon commercial bicycles and tricycles.

The invention also has for an object the arrangement of detachable front floats in the form of wheels for mounting upon the frame which supports the front wheel of a bicycle so that the bicycle may be ridden on land and also on water with the aid of rear floats also in the form of wheels and detachably mountable upon the frame of the rear wheels of the bicycle.

It is another object of this invention to build the bicycle in a manner so that the front and rear wheels are in the form of floats to adapt it to be driven on the water.

A still further object of this invention is the construction of the floats in which they are characterized by the provision of a plurality of pedals adapted to be rigidly extended or loose. When the device is driven on the water the paddles should be rigid, but when driven on land, in order to avoid possible damage by running over stones or the like, they should be moved to their loose position.

Furthermore, it is proposed to mount means upon the hydrocycle for causing the pedals to assume their loose conditions.

A still further object of this invention is the construction of a device of the class described which is of simple, durable construction, dependable in use and efficient in operation and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Figure 1:
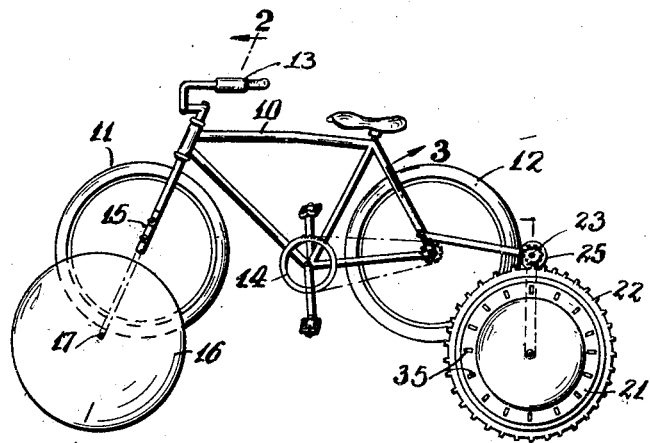
Fig. 1 is a side elevational view of a bicycle constructed according to this invention.
Figure 2:
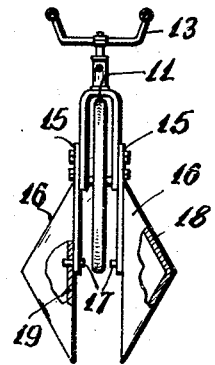
Fig. 2 is a sectional view taken on the line 2—2 of Fig. 1.

The reference numeral 10 indicates the frame of a bicycle which supports a front wheel 11 and a rear wheel 12. The details of the bicycle will not be gone into since it is of standard construction. The more important parts may be recognized by numeral 13 indicating the steering control and 14 the foot motive power. A pair of arms 15 are secured upon the opposite sides of the front portion of the frame of the bicycle and support floats 16 substantially in the form of wheels. These floats are rotatively mounted by axles 17 upon the rods 15. Each of the floats are composed of inflated rubber 18 secured upon a back disc 19.

At the rear, detachable frame sections 20 are secured upon the opposite sides of the rear portion of the frame of the bicycle and support floats 21 in the form of wheels. These floats are provided with peripheral teeth 22 meshing with pinions 23 upon a shaft 24 substituted for the shaft on the rear wheel 12 and carrying a friction wheel 25 driven by the rear wheel 12. The device may also be attached to a motorcycle or tricycle.

Figure 4:
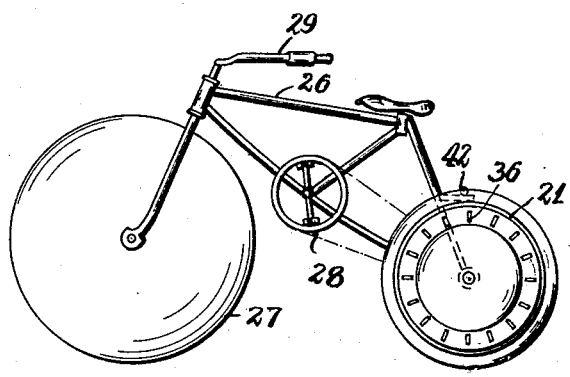
Fig. 4 is a side elevational view of a tricycle constructed according to this invention.
Figure 5:
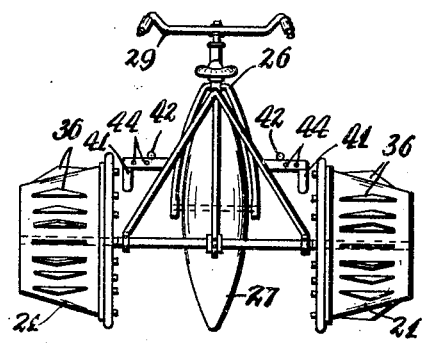
Fig. 5 is a rear elevational view of Fig. 4.

In Figs. 4 and 5 the same invention has been applied to a tricycle. Reference numeral 26 indicates the frame of the tricycle which is provided with a front wheel 27 and a pair of rear wheels 21. The rear wheels are in the form of floats and this is also true of the front wheel 27. A foot power driving means 28 is provided whereby the rear wheels may be rotated. The tricycle has a steering handle 29 as is customary. The front wheel 27 should be made of some material which is lighter than water and floats or should be of some inflated construction.

Each of the floats 21 are constructed with a rear disc 30 and a front disc 31 of smaller size. A plurality of pairs of adjacent rods 32 are arranged between the discs 30 and 31 and serve to hold them in separated positions. The ends of these rods slightly engage into the material of the discs. A flexible covering 33 of water proof material is engaged over the small disc and is secured upon the front face of the large disc by a clamping ring 34 held by screws 35. A plurality of paddle blades 36 extend through the material 33 and the inner portions thereof pass through spaced rods 32. Other spaced rods 37 are hingedly connected upon the inner face of the disc 31 and engage on opposite sides of the inner ends of the paddles 37 so as to hold the paddles rigidly. The free ends 38 of the rods 37 project from the disc 30. Resilient means 39 serves to urge the rods 37 upwards as limited by the large arm of a bayonet slot 40 in which position they are engaged against the opposite faces of the paddle 36.

Figure 3:
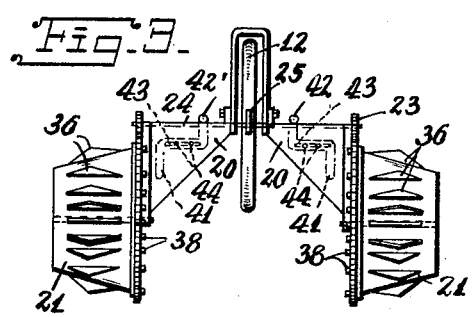
Fig. 3 is a sectional view taken on the line 3—3 of Fig. 1.
Figures 6, 7:
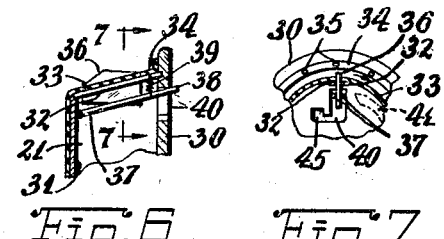
Fig. 6 is a fragmentary enlarged sectional view of one of the floats used in the device.
Fig. 7 is a sectional view taken on the line 7—7 of Fig. 6.

Cam elements 41 are adjustably mounted upon the frame of the bicycle shown in Fig. 3 or in the tricycle shown in Fig. 5 and are adapted to be moved to operative positions. Each of the cams 41 are provided with a head 42 so that they may be conveniently moved. These cams are adjustably supported by reason of having slots 43 engage between supporting bolts 44. When moved into operative position they extend into the path of motion of the ends 38 of the various rods previously mentioned and each of the cams are perched, as indicated in Fig. 7, so as to cause the rods 37 to be depressed and engage the small arm 45 of the bayonet slot 40. In the new positions the paddles 36 will be free.

When the device is operated in the water the paddles 36 should be placed in the rigid positions, that is, the rods 37 should have their free ends 38 in the large arms of the bayonet slots 40. When the device is operated on the land the cams 41 should be moved so that as the floats are turned the ends 38 of the rods will be moved into the small ends of the bayonet slots 40. The springs 39 will hold them in these positions. Then the paddles 38 may loosely flap back and forth. When it is desired not to use the floats 21 it is merely necessary to remove the screws 35 and then the rings 34, whereupon the flexible water proof material 33 may be slipped off. Then the disc 31 and the rods 32 and 37 together with the springs 39 may be stored away. In other words, the floats can be locked down so as to take up but a small compass.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. A hydrocycle, comprising a cycle having wheels, front and rear floats supported upon said wheels, the floats on the driver wheels of said cycle comprising spaced discs, rods holding said discs separated from each other, a water tight covering engaged over one of the discs and secured on the face of the other disc, paddles extended through the water tight covering and between said rods, holding rods hingedly mounted upon the covered disc and extending from the other disc and straddling said paddles to hold them rigidly in place, resilient means urging said rods into operative positions, and cams mounted upon the frame of said cycle and operable against the rods to move them into inoperative positions whereby the paddles are free.

2. A hydrocycle, comprising a cycle having wheels, front and rear floats supported upon said wheels, the floats on the driver wheels of said cycle comprising spaced discs, rods holding said discs separated from each other, a water tight covering engaged over one of the discs and secured on the face of the other disc, paddles extended through the water tight covering and between said rods, holding rods hingedly mounted upon the covered disc and extending from the other disc and straddling said paddles to hold them rigidly in place, resilient means urging said rods into operative positions, and cams mounted upon the frame of said cycle and operable against the rods to move them into inoperative positions whereby the paddles are free, said cams being adjustably mounted upon the frame of said cycle.

3. A hydrocycle, comprising a cycle having wheels, front and rear floats supported upon said wheels, the floats on the driver wheels of said cycle comprising spaced discs, rods holding said discs separated from each other, a water tight covering engaged over one of the discs and secured on the face of the other disc, paddles extended through the water tight covering and between said rods, holding rods hingedly mounted upon the covered disc and extending from the other disc and straddling said paddles to hold them rigidly in place, resilient means urging said rods into operative positions, and cams mounted upon the frame of said cycle and operable against the rods to move them into inoperative positions whereby the paddles are free, said water tight cover and the rods being removable.

In testimony whereof I have affixed my signature.

RICHARD GARGIULO.